United States Patent
Gong

(10) Patent No.: US 9,904,120 B2
(45) Date of Patent: Feb. 27, 2018

(54) LIQUID CRYSTAL TOUCH PANEL AND LIQUID CRYSTAL DISPLAY

(71) Applicant: Wuhan China Star Optoelectronics Technology Co., Ltd., Wuhan, Hubei (CN)

(72) Inventor: Qiang Gong, Guangdong (CN)

(73) Assignee: Wuhan China Star Optoelectronics Technology Co., Ltd., Wuhan, Hubei (CN)

( * ) Notice: Subject to any disclaimer, the term of this patent is extended or adjusted under 35 U.S.C. 154(b) by 252 days.

(21) Appl. No.: 15/010,148

(22) Filed: Jan. 29, 2016

(65) Prior Publication Data

US 2017/0192277 A1 Jul. 6, 2017

(30) Foreign Application Priority Data

Dec. 31, 2015 (CN) .......................... 2015 1 1028505

(51) Int. Cl.
| | | |
|---|---|---|
| G02F 1/1335 | (2006.01) | |
| G02F 1/1339 | (2006.01) | |
| G02F 1/1333 | (2006.01) | |
| G06F 3/044 | (2006.01) | |
| G06F 3/041 | (2006.01) | |

(52) U.S. Cl.
CPC ...... *G02F 1/13394* (2013.01); *G02F 1/13338* (2013.01); *G06F 3/044* (2013.01); *G06F 3/0412* (2013.01); *G02F 2001/13396* (2013.01)

(58) Field of Classification Search
CPC ............. G02F 1/13338; G02F 1/13394; G02F 2001/13396; G06F 3/0412; G06F 3/044
USPC .......................................................... 349/12
See application file for complete search history.

(56) References Cited

U.S. PATENT DOCUMENTS

| | | | |
|---|---|---|---|
| 2011/0063537 A1* | 3/2011 | Kim ................... | G02F 1/13338 349/42 |
| 2012/0274603 A1* | 11/2012 | Kim ...................... | G06F 3/0412 345/174 |

* cited by examiner

*Primary Examiner* — Nathanael R Briggs
*Assistant Examiner* — William Peterson
(74) *Attorney, Agent, or Firm* — Andrew C. Cheng

(57) ABSTRACT

A liquid crystal touch panel including an array and a color filter substrate disposed oppositely, wherein, on the array substrate, a common electrode layer and a planarization layer are disposed sequentially; the common electrode layer is divided into multiple self-capacitance electrodes; on the planarization layer, multiple electrode leads are provided; an insulation protective layer covers on the multiple electrode leads; between the array substrate and the color filter substrate, a main and an auxiliary post spacer having a same height are provided; first terminals of the main and the auxiliary post spacer are connected with the color filter substrate; a second terminal of the main post spacer abuts on the insulation protective layer, and right opposite to the electrode lead; a second terminal of the auxiliary post space is floating above the insulation protective layer and right opposite to a region without the electrode lead.

20 Claims, 3 Drawing Sheets

LIQUID CRYSTAL TOUCH PANEL AND LIQUID CRYSTAL DISPLAY

BACKGROUND OF THE INVENTION

1. Field of the Invention

The present disclosure relates to a liquid crystal display technology field, and more particularly to a liquid crystal touch panel and a liquid crystal display including the liquid crystal touch panel.

2. Description of Related Art

A Liquid Crystal Display (TFT-LCD) has features of small size, low power consumption and relatively low manufacturing costs, no radiation and so on such that the TFT-LCD hold a dominant position in the current flat display device. The TFT-LCD is widely applied in various electric devices such as a cell phone, a tablet computer, etc. Along with the development of the TFT-LCD, the liquid crystal display technology becomes more and more mature. The consumer gradually pays attention to beautiful appearance from the technology. For example, the color of the case greatly affects the likeability of the consumer.

A Liquid Crystal Display (LCD) has many advantages of thin body, power saving, no radiation, etc. so that the LCD is widely applied. In the current market, most of the LCD is a backlight type LCD including a liquid crystal panel and a backlight module. Usually, the liquid crystal panel is formed by a Color Filter (CF), a thin-film transistor array substrate (Array), a liquid crystal layer clamped between the CF and the thin-film transistor array substrate and a sealant plastic frame. Wherein, a thickness of the liquid crystal layer that is a cell gap is controlled by a height of a post spacer (PS) between the array substrate and the color filter substrate. The thickness of the liquid crystal layer has an important affection for the structure parameter and the display quality of the liquid crystal display.

The current post spacer is formed on a black matrix of the color filter substrate through processes of a mask process, a lithographic process and so on. After the color filter substrate and the thin-film transistor array substrate are aligned, the post spacer is supported on a planarization layer of the array substrate. The post spacer located between the color filter substrate and the array substrate provides a supporting and buffering function to the above substrates in order to maintain a preset cell gap to ensure the stability of an image display. Currently, a large-sized and high resolution TV is increasingly favored by consumers. In a large-sized liquid crystal display panel, over two types of post spacers are adopted such as disposing a main post spacer (Main PS) and an auxiliary post spacer (Sub PS) on the color filter substrate in order to provide a multi-stage buffering function so as to prevent Mura or other display abnormality. Wherein, a height of the main post spacer is higher than a height of the auxiliary post spacer, and the number of the auxiliary post spacer is greater than the number of the main post spacer so that the main post spacer and the auxiliary post spacer are formed by different processes. When the liquid crystal panel forms a box, the main post spacer generates some compression values in order to support the cell gap so that the main post spacer is under a compression status, and the auxiliary post spacer does not have a compression value. When the liquid crystal panel suffers an excessive force, the auxiliary post spacer is compressed to provide an auxiliary supporting function.

Currently, along with the rapid development of the display technology, a Touch Screen Panel is more popular in people's life. A touch structure of the touch screen panel can be divided into a mutual capacitance touch structure and a self-capacitance touch structure. For the self-capacitance touch structure, because the accuracy and the signal to noise ratio of a touch sensing are higher, the self-capacitance touch structure is favored by main panel manufactures. Currently, the self-capacitance touch panel adopts a self-capacitance principle to realize detecting a position of a finger. Specifically, in the touch structure, multiple self-capacitance electrodes which are located in a same layer and are independent with each other are provided. Each self-capacitance electrode is connected with a touch detection chip through a single and independent lead line. When a human does not touch the panel, a capacitance applied on each self-capacitance electrode is a fixed value. When a human touch the panel, a capacitance applied on the self-capacitance electrode corresponding to a touch location is the fixed value and a human capacitor. The touch detection chip detects a change of a capacitance of each self-capacitance electrode in a touch time stage in order to determine a touch position.

As shown in FIG. 1, which is a schematic structure diagram of a liquid crystal touch panel of the conventional art. The liquid crystal touch panel includes an array substrate 1 and a color filter substrate 2 which are disposed oppositely. The array substrate 1 and the color filter substrate 2 are separated by a main post spacer 3a and an auxiliary post spacer 3b. The array substrate 1 is provided with a common electrode layer 4 and a planarization layer 5 which are disposed sequentially. The common electrode layer 4 is divided into multiple self-capacitance electrodes 4a which are isolated with each other. On the planarization layer 5, multiple electrode leads 6 are provided. The multiple electrode leads 6 and the multiple self-capacitance electrodes 4a are electrically connected one by one in order to connect each self-capacitance electrodes 4a to an external touch detection chip (not shown in the figure). The multiple electrode leads 6 are covered with an insulation protective layer 7. Wherein, a terminal of each main post spacer 3a and auxiliary post spacer 3b is fixed to and connected with a black matrix 8 on the color filter substrate 2. The other terminal of each main post spacer 3a and auxiliary post spacer 3b is corresponding to the electrode lead 6 on the array substrate 1. Wherein, the other terminal of the main post spacer 3a is abutted and pressed on one of the electrode leads 6, and the main post spacer 3a is supported by the one of the electrode leads 6. For the auxiliary post spacer 3b, because a height (a length extended from the color filter substrate 2 toward the array substrate 1) of the auxiliary post spacer 3b is less than a height of the main post spacer 3a, the other terminal of the auxiliary post spacer 3b is located above and floating on another of the electrode leads 6.

In the liquid crystal touch panel having above structure, heights of the main post spacer 3a and the auxiliary post spacer 3b are different so that the difficulty of the manufacturing process of the post spacers is increased. Besides, the main post spacer 3a requires abutting on the electrode lead 6, and generally, a width of the electrode lead 6 is smaller so that the main post spacer 3a is easily to generate a misalignment so as to slip off from the electrode lead, which cannot maintain a stable liquid crystal cell gap.

SUMMARY OF THE INVENTION

Accordingly, the present disclosure provides a liquid crystal touch panel to solve the difficulty problem of manufacturing process of two kinds of post spacers having different heights. Besides, the post spacer can be stably supported to stably and evenly maintain a liquid crystal cell gap.

In order to achieve the above purpose, the present disclosure adopts following technology solutions:

A liquid crystal touch panel comprising an array substrate and a color filter substrate which are disposed oppositely, and a liquid crystal layer disposed between the array substrate and the color filter substrate, wherein, on the array substrate, a common electrode layer and a planarization layer are disposed sequentially; the common electrode layer is divided into multiple self-capacitance electrodes which are isolated with each other; on the planarization layer, multiple electrode leads are provided; the multiple electrode leads and the multiple self-capacitance electrodes are electrically connected one by one, and the multiple electrode leads are covered with an insulation protective layer; between the array substrate and the color filter substrate, a main post spacer and an auxiliary post spacer having a same height are provided; first terminals of the main post spacer and the auxiliary post spacer are connected with the color filter substrate; a second terminal of the main post spacer abuts on the insulation protective layer, and is right opposite to the electrode lead; a second terminal of the auxiliary post space is floating above the insulation protective layer and is right opposite to a region without providing the electrode lead.

Wherein, a black matrix is disposed on the color filter substrate, and the main post spacer and the auxiliary post spacer are formed on the black matrix.

Wherein, a color photoresist is disposed on the color filter substrate; the color photoresist includes a red photoresist, a green photoresist and a blue photoresist; the red photoresist, the green photoresist and the blue photoresist are separated each other by the black matrix.

Wherein, the multiple electrode leads are disposed right opposite to the black matrix.

Wherein, the multiple self-capacitance electrodes which are isolated with each other are arranged as a matrix, the electrode lead is electrically connected with a corresponding self-capacitance electrode by a through hole in the planarization layer.

Wherein, the electrode lead that disposed with the main post spacer above includes a first region right opposite to the main post spacer, and a width of the first region is greater than a width of the second terminal of the main post spacer.

Wherein, the electrode lead that disposed with the main post spacer above further includes a second region outside the first region, and a width of the second region is not greater than the width of the second terminal of the main post spacer.

Wherein, a cross section of each of the main post spacer and the auxiliary post spacer is a circular shape.

Wherein, a diameter of the first terminal of the main post spacer is greater than a diameter of the second terminal of the main post spacer, and a diameter of the first terminal of the auxiliary post spacer is greater than a diameter of the second terminal of the auxiliary post spacer.

The present disclosure also provides a liquid crystal display comprising a liquid crystal panel and a backlight module, wherein the liquid crystal panel and the backlight module are disposed oppositely, the backlight module provides a display light source to the liquid crystal panel such that the liquid crystal panel can display an image; wherein, the liquid crystal panel is a liquid crystal touch panel described above.

In the touch liquid crystal panel provided by the embodiments of the present disclosure, a location corresponding to the main post spacer is provided with the electrode lead, a location corresponding to the auxiliary post spacer is not provided with the electrode lead, and the height of the main post spacer and the height of the auxiliary post spacer are disposed as the same in order to achieve the purpose of multistage buffering. The height of the main post spacer and the height of the auxiliary post spacer are the same such that the main post spacer and the auxiliary post spacer can be obtained in a same process in order to decrease the process difficulty and save the cost. In a preferred embodiment, disposing a width of the electrode lead corresponding to the main post spacer to be greater than a width of a contact surface of the main post spacer such that the main post spacer is supported stably in order to stably and evenly maintain the liquid crystal cell gap.

DETAILED DESCRIPTION OF THE PREFERRED EMBODIMENT

The following content combines with the drawings and the embodiment for describing the present invention in detail. It is obvious that the following embodiments are only some embodiments of the present invention. For the person of ordinary skill in the art without creative effort, the other embodiments obtained thereby are still covered by the present invention.

Here, it should be noted that in order to avoid obscuring the present disclosure because of unnecessary detail, the figures only show structure and/or processing steps that are closely related according to the present solution, and the other details that are not related to the present disclosure is omitted.

Figure 1:
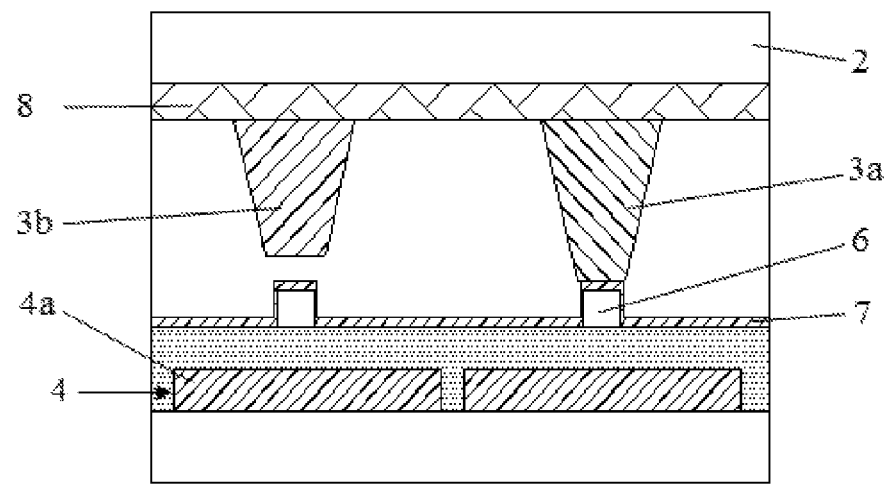
FIG. 1 is a schematic structure diagram of a liquid crystal touch panel of the conventional art.
Figure 2:
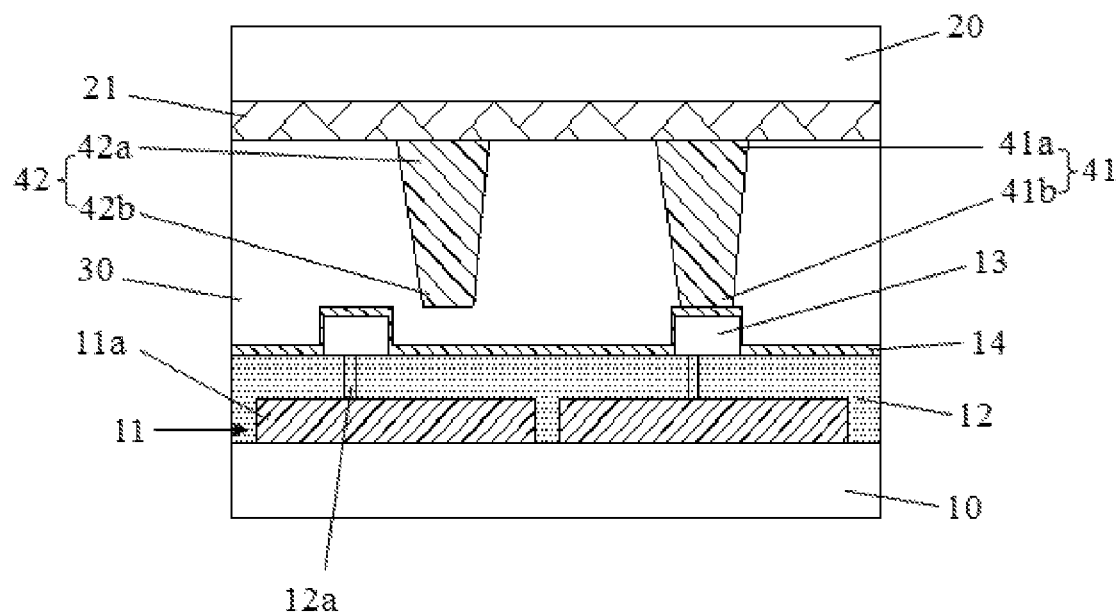
FIG. 2 is a schematic structure diagram of a liquid crystal touch panel provided by the embodiment of the present disclosure.

With reference to FIG. 2, and the present disclosure provides a liquid crystal touch panel. The liquid crystal touch panel includes an array substrate 10 and a color filter substrate 20 which are disposed oppositely, and a liquid crystal layer 30 disposed between the array substrate 10 and the color filter substrate 20.

Wherein, as shown in FIG. 2, on the array substrate 10, a common electrode layer 11 and a planarization layer 12 are disposed sequentially. The common electrode layer 11 is divided into multiple self-capacitance electrodes 11a which are isolated with each other. On the planarization layer 12, multiple electrode leads 13 are provided. The multiple electrode leads 13 and the multiple self-capacitance electrodes 11a are electrically connected one by one. The multiple electrode leads 13 are covered with an insulation protective layer 14. Specifically, with reference to FIG. 2 and FIG. 3, in the common electrode layer 11, the multiple self-capacitance electrodes 11a which are isolated with each other are arranged as a matrix. The electrode lead 13 is electrically connected with a corresponding self-capacitance electrode 11a through a through hole 12a in the planarization layer 12 (FIG. 3 only exemplarily shows a portion of the self-capacitance electrodes, and FIG. 3 does not show the planarization layer 12). Wherein, the self-capacitance electrode 11a can be used to transmit a common voltage and a touch scanning signal. Specifically, in a display period of one picture frame, the self-capacitance electrode 11a is used to transmit the common voltage and the touch scanning signal in a time-division manner.

Figure 4:
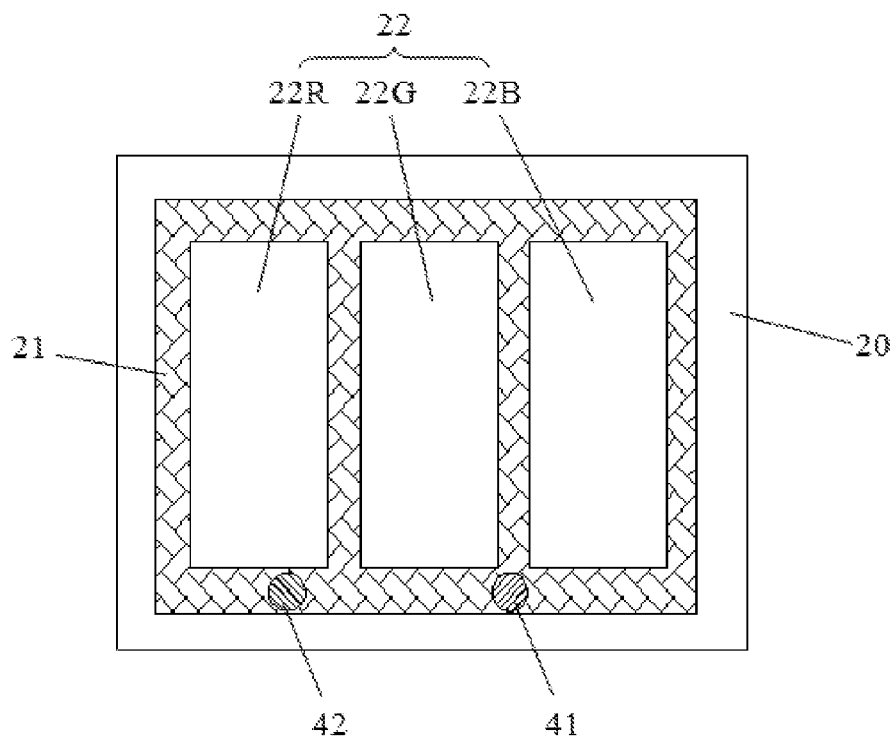
FIG. 4 is a schematic plane structure of a color filter substrate in the embodiment of the present disclosure.

Wherein, as shown in FIG. 2, between the array substrate 10 and the color filter substrate 20, a main post spacer 41 and an auxiliary post spacer 42 having a same height are provided. First terminals 41a, 41b of the main post spacer 41 and the auxiliary post spacer 42 are connected with the color filter substrate 20. A second terminal 41b of the main post spacer 41 abuts on the insulation protective layer 14, and is right opposite to the electrode lead 13. A second terminal 42b of the auxiliary post spacer 42 is floating above the insulation protective layer 14 and is right opposite to a region without providing the electrode lead 13. Specifically, as shown in FIG. 4, on the color filter substrate, a black matrix 21 and a color photoresist 22 are provided. The color photoresist includes a red photoresist 22R, a green photoresist 22G and a blue photoresist 22B. The red photoresist 22R, the green photoresist 22G and the blue photoresist 22B are separated each other by the black matrix 21. The main post spacer 41 and the auxiliary post spacer 42 are formed on the black matrix 21. Each pixel unit includes one red photoresist 22R, one green photoresist 22G and one blue photoresist 22B. FIG. 4 only exemplarily shows one pixel unit.

The liquid crystal touch panel provided above, on the array substrate 10, a location corresponding to the main post spacer 41 is provided with the electrode lead 13, and a location corresponding to the auxiliary post spacer 42 is not provided with the electrode lead 13. The height of the main post spacer 41 and the height of the auxiliary post spacer 42 are disposed as the same in order to achieve the purpose of multi-stage buffering. Besides, because the height of the main post spacer 41 and the height of the auxiliary post spacer 42 are the same, the main post spacer and the auxiliary post spacer can be made by a same process so as to decrease a process difficulty and save the cost.

Figure 3:
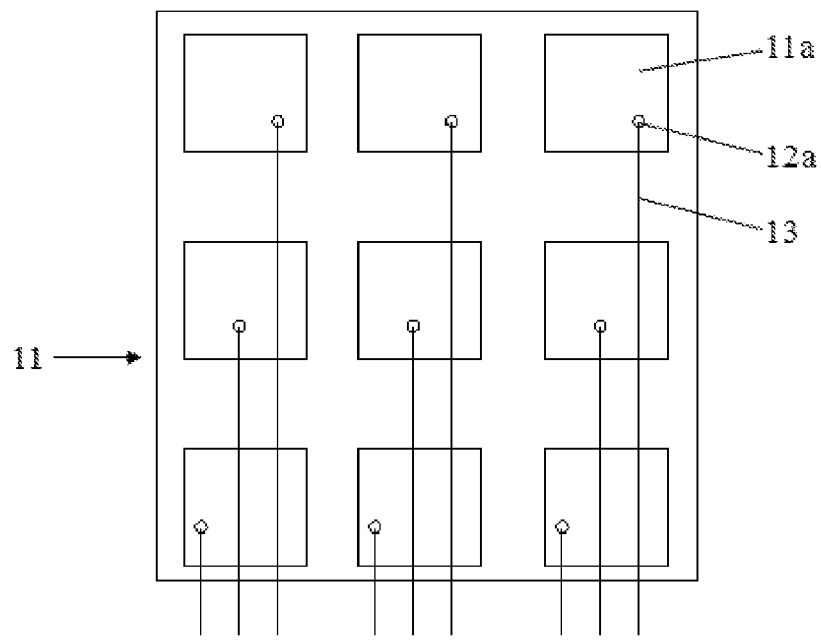
FIG. 3 is a schematic distribution diagram of self-capacitance electrodes in the embodiment of the present disclosure.

Wherein, with reference to FIG. 3, the common electrode layer 11 is divided into multiple self-capacitance electrodes 11a which are isolated with each other. A size of each self-capacitance electrode 11a can correspond to one pixel unit or multiple pixel units. When the number of the self-capacitance electrodes 11a divided from the common electrode layer 11 is less, an area of a single self-capacitance electrode 11a is larger so that the self-capacitance electrode can correspond to multiple pixel units. When the number of the self-capacitance electrodes 11a divided from the common electrode layer 11 is more, an area of a single self-capacitance electrode 11a is less so that the self-capacitance electrode can correspond to one pixel unit. However, no matter that the common electrode layer 11 is divided into how many self-capacitance electrodes 11a which are isolated with each other, the multiple electrode leads 13 of the self-capacitance electrodes 11a are disposed right opposite to the black matrix 21 on the color filter substrate 20.

Wherein, the number of the main post spacers 41 and the auxiliary post spacers 42 can be decided according to an area of the liquid crystal panel. Generally, the number of the auxiliary post spacers 42 is greater than the number of the main post spacers 41. The main post spacer 41 and the auxiliary post spacer 42 can be separated with multiple pixel units. The number of the electrode leads 13 is not corresponding to the number of the main post spacers 41. However, below a location of the main post spacer 41, a corresponding electrode lead 13 must be provided, and above a location of the electrode lead 13, the main post spacer 41 is not necessarily to be provided.

Figure 5:
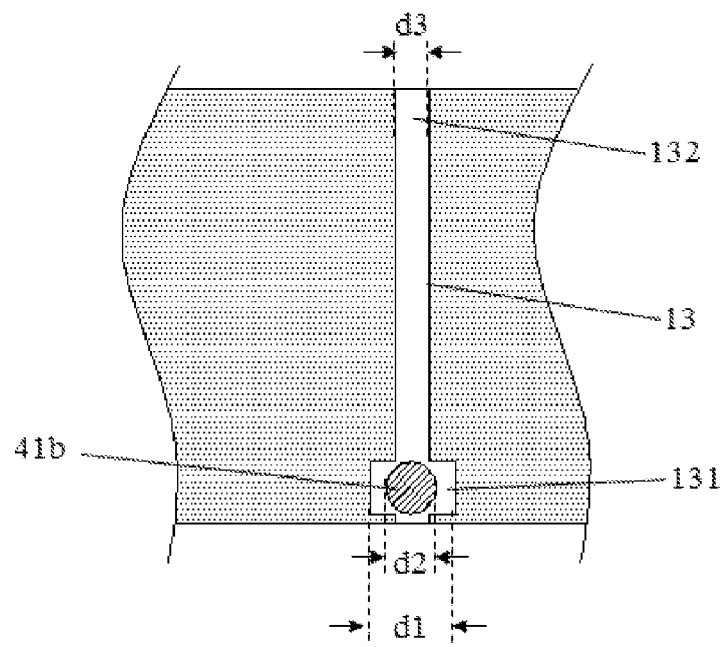
FIG. 5 is schematic diagram of electrode leads in the embodiment of the present disclosure.

In the present embodiment, with reference to FIG. 2 and FIG. 5, for the electrode lead 13 that disposed with a main post spacer 41 above, the electrode lead 13 includes a first region 131 right opposite to the main post spacer 41, and a width d1 of the first region 131 is greater than a width d2 of the second terminal 41b of the main post spacer 41. Furthermore, for the electrode lead 13 that disposed with a main post spacer 41 above, the electrode lead 13 also includes a second region 132 outside the first region 131. A width d3 of the second region 132 is not greater than a width d2 of the second terminal 41b of the main post spacer 41. Disposing a width of the electrode lead 13 corresponding to the main post spacer 41 to be greater than a width of a contact surface of the main post spacer 41 such that the main post spacer 41 is supported stably in order to stably and evenly maintain the liquid crystal cell gap. As described above, above a location of the electrode lead 13, the main post spacer 41 is not necessarily to be provided. Therefore, the electrode lead 13 that does not dispose with a main post spacer 41 above, only the second region 132 is provided.

Figure 6:
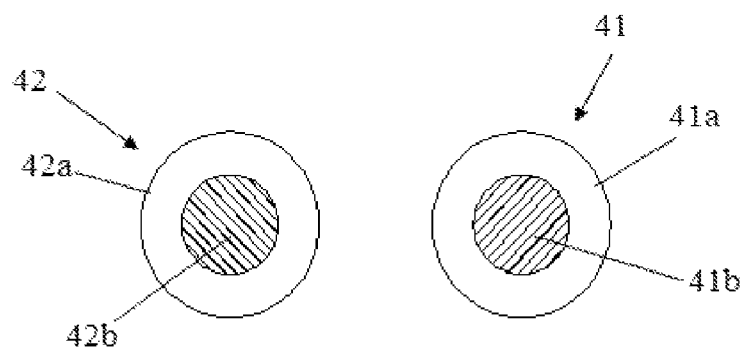
FIG. 6 is a bottom view of a main post spacer and an auxiliary post spacer in the embodiment of the present disclosure.

In the present embodiment, as shown in FIG. 6, a cross section of each of the main post spacer 41 and the auxiliary post spacer 42 is a circular shape. Wherein, a diameter of the first terminal 41a of the main post spacer 41 is greater than a diameter of the second terminal 41b of the main post spacer 41. A diameter of the first terminal 42a of the auxiliary post spacer 42 is greater than a diameter of the second terminal 42b of the auxiliary post spacer 42.

Figure 7:
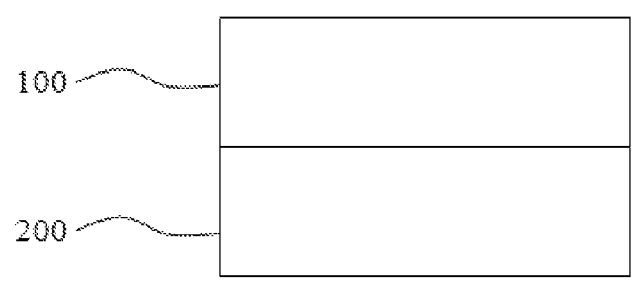
FIG. 7 is a structure block diagram of a liquid crystal display provided by the embodiment of the present disclosure.

The present disclosure also provides a liquid crystal display, as shown in FIG. 7, the liquid crystal display includes the liquid crystal touch panel 100 provided by the embodiments of the present disclosure and a backlight module 200. The liquid crystal panel 100 and the backlight module 200 are disposed oppositely. The backlight module 200 provides a display light source to the liquid crystal panel 100 such that the liquid crystal panel 100 can display an image.

In summary, in the liquid crystal touch panel provided by the embodiments of the present disclosure, the height of the main post spacer and the height of the auxiliary post spacer are the same such that the main post spacer and the auxiliary post spacer can be obtained in a same process in order to decrease the process difficulty and save the cost. In a preferred embodiment, disposing a width of the electrode lead corresponding to the main post spacer to be greater than a width of a contact surface of the main post spacer such that the main post spacer is supported stably in order to stably and evenly maintain the liquid crystal cell gap.

It should be noted that, herein, relational terms such as first and second, and the like are only used to distinguish one entity or operation from another entity or operation. It is not required or implied that these entities or operations exist any such relationship or order between them. Moreover, the terms "comprise," include," or any other variation thereof, are intended to cover a non-exclusive inclusion, such that a series of elements including the process, method, article or device that includes not only those elements but also other elements not expressly listed or further comprising such process, method, article or device inherent elements. Without more constraints, by the statement "comprises one . . . " element defined does not exclude the existence of additional identical elements in the process, method, article, or apparatus.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:

1. A liquid crystal touch panel comprising an array substrate and a color filter substrate which are disposed oppositely, and a liquid crystal layer disposed between the array substrate and the color filter substrate, wherein,
on the array substrate, a common electrode layer and a planarization layer are disposed sequentially; the common electrode layer is divided into multiple self-capacitance electrodes which are isolated with each other; on the planarization layer, multiple electrode leads are provided; the multiple electrode leads and the multiple self-capacitance electrodes are electrically connected one by one, and the multiple electrode leads are covered with an insulation protective layer; and
between the array substrate and the color filter substrate, a main post spacer and an auxiliary post spacer having a same height are provided; first terminals of the main post spacer and the auxiliary post spacer are connected with the color filter substrate; a second terminal of the main post spacer abuts on the insulation protective layer, and is right opposite to the electrode lead; a second terminal of the auxiliary post space is floating above the insulation protective layer and is right opposite to a region without providing the electrode lead.

2. The liquid crystal touch panel according to claim 1, wherein, a black matrix is disposed on the color filter substrate, and the main post spacer and the auxiliary post spacer are formed on the black matrix.

3. The liquid crystal touch panel according to claim 2, wherein, a color photoresist is disposed on the color filter substrate; the color photoresist includes a red photoresist, a green photoresist and a blue photoresist; the red photoresist, the green photoresist and the blue photoresist are separated each other by the black matrix.

4. The liquid crystal touch panel according to claim 2, wherein, the multiple electrode leads are disposed right opposite to the black matrix.

5. The liquid crystal touch panel according to claim 4, wherein, the multiple self-capacitance electrodes which are isolated with each other are arranged as a matrix, the electrode lead is electrically connected with a corresponding self-capacitance electrode by a through hole in the planarization layer.

6. The liquid crystal touch panel according to claim 5, wherein, the electrode lead that disposed with the main post spacer above includes a first region right opposite to the main post spacer, and a width of the first region is greater than a width of the second terminal of the main post spacer.

7. The liquid crystal touch panel according to claim 1, wherein, the electrode lead that disposed with the main post spacer above includes a first region right opposite to the main post spacer, and a width of the first region is greater than a width of the second terminal of the main post spacer.

8. The liquid crystal touch panel according to claim 7, wherein, the electrode lead that disposed with the main post spacer above further includes a second region outside the first region, and a width of the second region is not greater than the width of the second terminal of the main post spacer.

9. The liquid crystal touch panel according to claim 7, wherein, a cross section of each of the main post spacer and the auxiliary post spacer is a circular shape.

10. The liquid crystal touch panel according to claim 9, wherein, a diameter of the first terminal of the main post spacer is greater than a diameter of the second terminal of the main post spacer, and a diameter of the first terminal of the auxiliary post spacer is greater than a diameter of the second terminal of the auxiliary post spacer.

11. A liquid crystal display comprising a liquid crystal panel and a backlight module, wherein the liquid crystal panel and the backlight module are disposed oppositely, the backlight module provides a display light source to the liquid crystal panel such that the liquid crystal panel can display an image;
wherein, the liquid crystal panel is a liquid crystal touch panel comprising an array substrate and a color filter substrate which are disposed oppositely, and a liquid crystal layer disposed between the array substrate and the color filter substrate, wherein,
on the array substrate, a common electrode layer and a planarization layer are disposed sequentially; the common electrode layer is divided into multiple self-capacitance electrodes which are isolated with each other; on the planarization layer, multiple electrode leads are provided; the multiple electrode leads and the multiple self-capacitance electrodes are electrically connected one by one, and the multiple electrode leads are covered with an insulation protective layer; and
between the array substrate and the color filter substrate, a main post spacer and an auxiliary post spacer having a same height are provided; first terminals of the main post spacer and the auxiliary post spacer are connected with the color filter substrate; a second terminal of the main post spacer abuts on the insulation protective layer, and is right opposite to the electrode lead; a second terminal of the auxiliary post space is floating above the insulation protective layer and is right opposite to a region without providing the electrode lead.

12. The liquid crystal display according to claim 11, wherein, a black matrix is disposed on the color filter substrate, and the main post spacer and the auxiliary post spacer are formed on the black matrix.

13. The liquid crystal display according to claim 12, wherein, a color photoresist is disposed on the color filter substrate; the color photoresist includes a red photoresist, a green photoresist and a blue photoresist; the red photoresist, the green photoresist and the blue photoresist are separated each other by the black matrix.

14. The liquid crystal display according to claim 12, wherein, the multiple electrode leads are disposed right opposite to the black matrix.

15. The liquid crystal display according to claim 14, wherein, the multiple self-capacitance electrodes which are isolated with each other are arranged as a matrix, the electrode lead is electrically connected with a corresponding self-capacitance electrode by a through hole in the planarization layer.

16. The liquid crystal display according to claim 15, wherein, the electrode lead that disposed with the main post spacer above includes a first region right opposite to the main post spacer, and a width of the first region is greater than a width of the second terminal of the main post spacer.

17. The liquid crystal display according to claim 11, wherein, the electrode lead that disposed with the main post spacer above includes a first region right opposite to the main post spacer, and a width of the first region is greater than a width of the second terminal of the main post spacer.

18. The liquid crystal display according to claim 17, wherein, the electrode lead that disposed with the main post spacer above further includes a second region outside the first region, and a width of the second region is not greater than the width of the second terminal of the main post spacer.

19. The liquid crystal display according to claim 17, wherein, a cross section of each of the main post spacer and the auxiliary post spacer is a circular shape.

20. The liquid crystal display according to claim 19, wherein, a diameter of the first terminal of the main post spacer is greater than a diameter of the second terminal of the main post spacer, and a diameter of the first terminal of the auxiliary post spacer is greater than a diameter of the second terminal of the auxiliary post spacer.

* * * * *